(12) United States Patent
Kim et al.

(10) Patent No.: US 8,936,074 B2
(45) Date of Patent: Jan. 20, 2015

(54) APPARATUS FOR DISTRIBUTING CARBON DIOXIDE WITH ADVANCED FUNCTION OF ADJUSTING PRESSURE AND TEMPERATURE OF CARBON DIOXIDE FOR GEOLOGIC INJECTION OF CARBON DIOXIDE

(75) Inventors: Tae-Hee Kim, Daejeon (KR); Ki-Sung Sung, Incheon (KR); Jeong-Chan Kim, Daejeon (KR)

(73) Assignee: Korea Institute of Geoscience and Mineral Resources (Kigam), Daejeon (KR)

( * ) Notice: Subject to any disclaimer, the term of this patent is extended or adjusted under 35 U.S.C. 154(b) by 692 days.

(21) Appl. No.: 13/234,327

(22) Filed: Sep. 16, 2011

(65) Prior Publication Data

US 2012/0073799 A1  Mar. 29, 2012

(30) Foreign Application Priority Data

Sep. 28, 2010  (KR) .................. 10-2010-0093847

(51) Int. Cl.
| | | |
|---|---|---|
| *E21B 43/00* | (2006.01) | |
| *E21B 36/04* | (2006.01) | |
| *G05D 23/19* | (2006.01) | |
| *G05D 7/06* | (2006.01) | |

(52) U.S. Cl.
CPC .............. *G05D 23/19* (2013.01); *G05D 7/0641* (2013.01)

USPC ............. 166/90.1; 166/402; 166/303; 166/57

(58) Field of Classification Search
USPC ................................... 166/90.1, 402, 303, 57
See application file for complete search history.

(56) References Cited

U.S. PATENT DOCUMENTS

| | | | | |
|---|---|---|---|---|
| 3,108,636 | A * | 10/1963 | Peterson | 166/308.1 |
| 2004/0168811 | A1 * | 9/2004 | Shaw et al. | 166/368 |
| 2009/0200011 | A1 * | 8/2009 | Decker | 166/90.1 |

* cited by examiner

*Primary Examiner* — Giovanna Wright
(74) *Attorney, Agent, or Firm* — Chapin IP Law, LLC

(57) ABSTRACT

An apparatus for distributing $CO_2$ with an advanced function of adjusting the pressure and temperature of $CO_2$ for geologic injection includes a manifold including a plurality of branching pipes to receive carbon dioxide for geologic injection from a plurality of storage tanks, a distribution chamber having an inlet communicating with the manifold and an outlet connected to an injection pipe extending to an underground tubular well, so that the carbon dioxide, which has been received through the manifold, is supplied through the injection pipe, a temperature adjusting part to adjust the temperature of the carbon dioxide introduced into the distribution chamber, and a flow rate and hydraulic pressure adjusting part to adjust a flow rate and a hydraulic pressure of the carbon dioxide injected into an underground through the distribution chamber. The temperature and pressure conditions of $CO_2$ on geologic injection are controlled through a user interface.

11 Claims, 5 Drawing Sheets

APPARATUS FOR DISTRIBUTING CARBON DIOXIDE WITH ADVANCED FUNCTION OF ADJUSTING PRESSURE AND TEMPERATURE OF CARBON DIOXIDE FOR GEOLOGIC INJECTION OF CARBON DIOXIDE

CROSS-REFERENCE TO RELATED APPLICATION

This application claims priority to Korean Patent Application No. 10-2010-0093847 filed on Sep. 28, 2010 in the Korean Intellectual property, the disclosure of which is entirely incorporated herein by reference.

BACKGROUND OF THE INVENTION

1. Field of the Invention

The present invention relates generally to an apparatus for distributing carbon dioxide with an advanced function of adjusting a pressure and a temperature of the carbon dioxide for geologic injection of the carbon dioxide. More particularly, the present invention relates to an apparatus for distributing carbon dioxide with an advanced function of adjusting a pressure and a temperature of the carbon dioxide for the geologic injection of the carbon dioxide, capable of optimizing the pressure and the temperature of the carbon dioxide while monitoring the pressure and the temperature of the carbon dioxide, so that the stability for the geologic injection of the carbon dioxide can be ensured.

2. Description of the Related Art

Carbon dioxide ($CO_2$) storage technologies include an ocean storage technology and a mineral carbonation technology in addition to a geologic storage technology.

Among them, the ocean storage technology is to store $CO_2$ in a gas, liquid, solid, or hydrate state into an ocean or an ocean floor. However, the ocean storage technology is not performed yet due to the worries about the destruction of the ocean ecosystem and the instability for the long-term storage of $CO_2$.

In addition, the mineral carbonation technology is to store $CO_2$ in the state of an insoluble carbonate mineral by allowing the $CO_2$ to be subject to chemical reaction with metallic oxides such as Ca and Mg mainly. According to the mineral carbonation technology, a great amount of reaction energy may be required and environment pollution may be caused when the carbonate mineral is stored and treated. Accordingly, realizing the mineral carbonation technology is difficult currently. Therefore, until now, the geologic storage technology is regarded as the most effective storage technology of $CO_2$.

The geologic storage technology is to store $CO_2$ into a proper geologic formation placed at the depth of about 750 m to about 1000 m from the ground (or geologic formation placed on the ocean floor).

Since the $CO_2$ injected at the depth of about 750 m to about 1000 m exists in a supercritical fluid state, the behavior of the $CO_2$ is very slow, and the $CO_2$ reacts with the fluid around the geologic formation or under the ground, so that the $CO_2$ is fixed or melted. To this regard, the geologic storage technology is called a geologic sequestration technology.

According to the geologic storage technology for $CO_2$, in order to effectively and stably inject $CO_2$ by using injection facilities such as a pressure device after stably constructing a long-depth bore hole to a geologic formation for geologic storage having the depth of several Kms, ground facilities for high-pressure injection must be designed and managed, and the gas leakage must be prevented. In particular, when injecting $CO_2$, the phase change of $CO_2$ according to the temperature and the pressure corresponds to an important management factor.

Therefore, an apparatus for distributing $CO_2$ by more effectively adjusting the temperature and the pressure of $CO_2$ in the geologic injection of $CO_2$ is required.

SUMMARY OF THE INVENTION

Accordingly, the present invention has been made keeping in mind the above problems occurring in the prior art, and an object of the present invention is to provide an apparatus for distributing carbon dioxide, capable of optimizing a pressure and a temperature of the carbon dioxide in geologic injection of the carbon dioxide.

Another object of the present invention is to provide an apparatus for distributing carbon dioxide with a monitoring device capable of effectively watching and supervising the temperature and the pressure of carbon dioxide injected into the underground through the apparatus for distributing the carbon dioxide.

To accomplish these objects, according to one aspect of the present invention, there is provided an apparatus for distributing carbon dioxide with an advanced function of adjusting a pressure and a temperature of the carbon dioxide for geologic injection. The apparatus includes a manifold part including a plurality of branching pipes to receive carbon dioxide for geologic injection from a plurality of storage tanks, a distribution chamber part having an inlet communicating with the manifold part and an outlet connected to an injection pipe extending to an underground tubular well, so that the carbon dioxide, which has been received through the manifold part, is supplied through the injection pipe, a temperature adjusting part to adjust the temperature of the carbon dioxide introduced into the distribution chamber part, and a flow rate and hydraulic pressure adjusting part to adjust a flow rate and a hydraulic pressure of the carbon dioxide injected into an underground through the distribution chamber part.

Preferably, the temperature adjusting part includes a temperature sensor mounted on the injection pipe to detect the temperature of the carbon oxide to be injected into the underground from the distribution chamber part, and a heating part surrounding an outer circumferential portion of the distribution chamber part to heat the carbon dioxide introduced into the distribution chamber part, so that the temperature of the carbon dioxide is increased.

The temperature adjusting part includes a temperature comparison part to compare the temperature of the carbon dioxide to be injected into the underground, which is detected by the temperature sensor, with a preset reference value, a temperature calculator to calculate a compensation value for the temperature of the carbon dioxide to be increased by the heating part based on the comparison with the reference value, and a temperature controller to control an operation of the heating part so that the temperature of the carbon dioxide in the distribution chamber part is increased by the compensation value.

Preferably, the heating part includes an induction heater.

In addition, preferably, the flow rate and hydraulic pressure adjusting part includes a flow rate detector mounted on the injection pipe to detect the flow rate of the carbon dioxide to be injected into the underground, a hydraulic pressure detector mounted on the injection pipe to detect the hydraulic pressure of the carbon dioxide to be injected into the underground, and a valve part mounted on the injection pipe to adjust the flow rate and the hydraulic pressure of the carbon dioxide to be injected into the underground from the distribution chamber part.

The flow rate and hydraulic pressure adjusting part may further include a flow rate and hydraulic pressure controller to compare the flow rate and the hydraulic pressure of the carbon dioxide, which are detected through the flow rate detector and the hydraulic pressure detector, with preset reference values, respectively, and to control an open/closing operation of the valve part, so that the carbon dioxide to be injected into the underground is supplied at a proper hydraulic pressure and at a proper flow rate.

Preferably, the apparatus further includes a socket provided at one side of the manifold part and having a shape of an expanded tube connected with the storage tanks through pipes.

In addition, the apparatus may further include electric heating devices provided at lower portions of the storage tanks to heat the carbon dioxide stored in the storage tanks, so that the carbon dioxide is maintained at a predetermined temperature.

Preferably, the apparatus further includes stop valves and pressure gauges provided at outlets of the storage tanks. Each stop valve is closed and open to adjust flow of carbon dioxide to be supplied into the distribution chamber part, and each pressure gauge detects a hydraulic pressure of the carbon dioxide to be supplied to the distribution chamber part.

In addition, preferably, the apparatus may further include a communication interface used to transmit operating signals of the temperature adjusting part and the flow rate and hydraulic adjusting part through a wire/wireless communication network in real time, for each time, or upon user's request, and an integration server to transmit data, which are received through the communication interface, to a remote user terminal, to receive a feedback command requested from the user, and to apply the command the temperature adjusting part and the flow rate and hydraulic pressure adjusting part through the communication interface.

The integration server may include a data log part to record data received through the communication interface into an additional record medium.

In this case, data transmitted to a remote user through the integration server are converted into at least one of text information, image information, and voice information, so that the transmitted data are receivable in a user terminal.

As described above, according to the apparatus for distributing $CO_2$ with an advanced function of adjusting the pressure and the temperature of $CO_2$ for $CO_2$ geologic injection, when distributing $CO_2$, the temperature and the pressure of $CO_2$ are optimized, so that the phase change of the $CO_2$ for geologic injection can be stably maintained.

In addition, according to the apparatus for distributing $CO_2$ with an advanced function of adjusting the pressure and the temperature of $CO_2$ for $CO_2$ geologic injection, a user can monitor all information about the temperature of $CO_2$ and the pressure control of the $CO_2$ in real time, thereby effectively managing and supervising the geologic injection of $CO_2$.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, an apparatus for distributing carbon dioxide with an advanced function of adjusting a pressure and a temperature of the carbon dioxide for the geologic injection of the carbon dioxide according to the exemplary embodiments of the present invention will be described.

The advantages, the features, and schemes of achieving the advantages and features will be apparently comprehended by those skilled in the art based on the embodiments, which are detailed later in detail, together with accompanying drawings.

The present invention is not limited to the following embodiments but includes various applications and modifications. The embodiments will make the disclosure of the present invention complete, and allow those skilled in the art to completely comprehend the scope of the present invention. The present invention is defined only by the scope of the appended claims.

If it is determined that description about well known functions or configurations may make the subject matter of the present invention unclear, the details thereof will be omitted.

Figure 1:
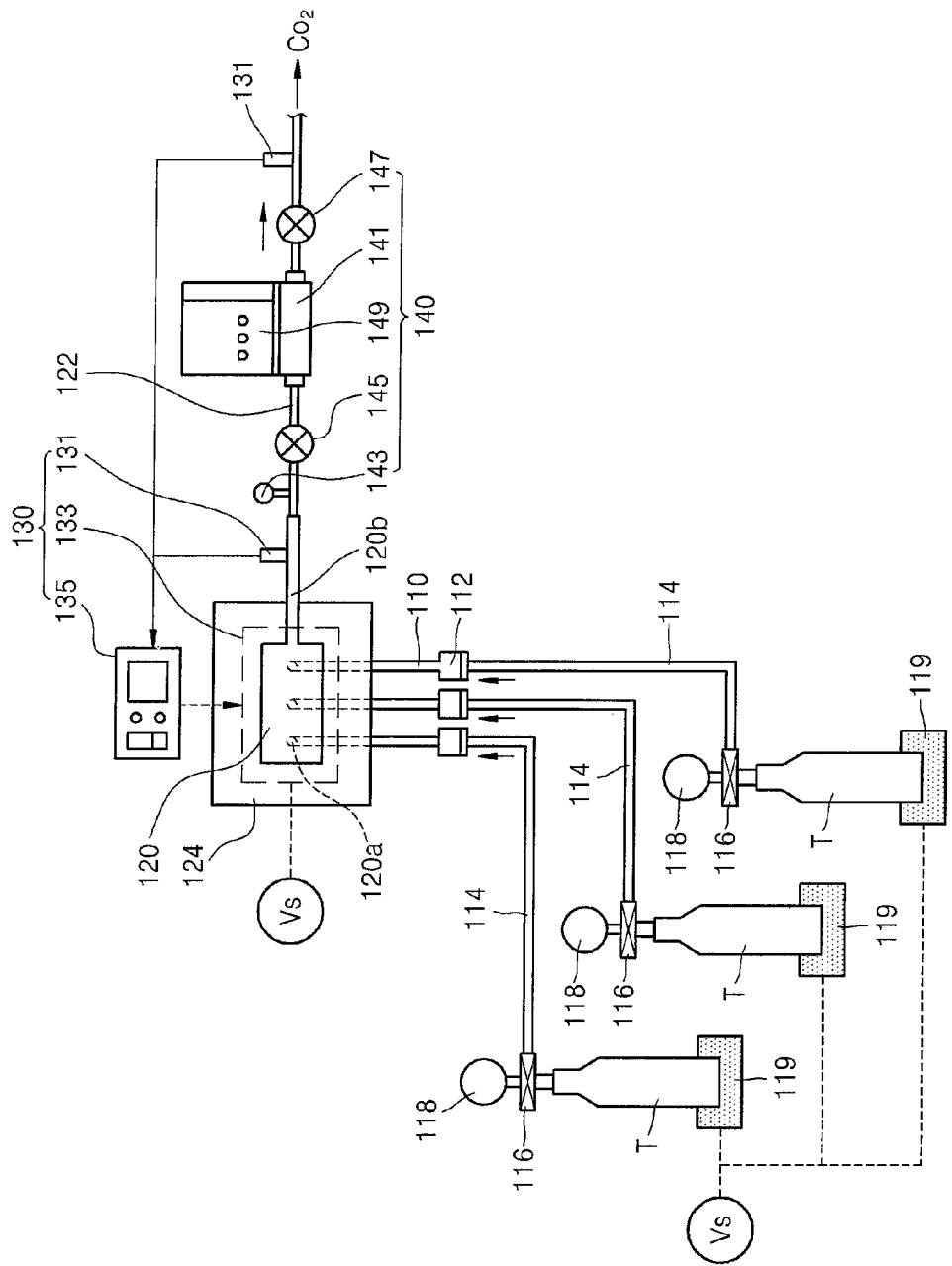
FIG. 1 is a schematic view showing an apparatus for distributing $CO_2$ with an advanced function of adjusting a pressure and a temperature of $CO_2$ for geologic injection of $CO_2$ according to one embodiment of the present invention.
Figure 2:
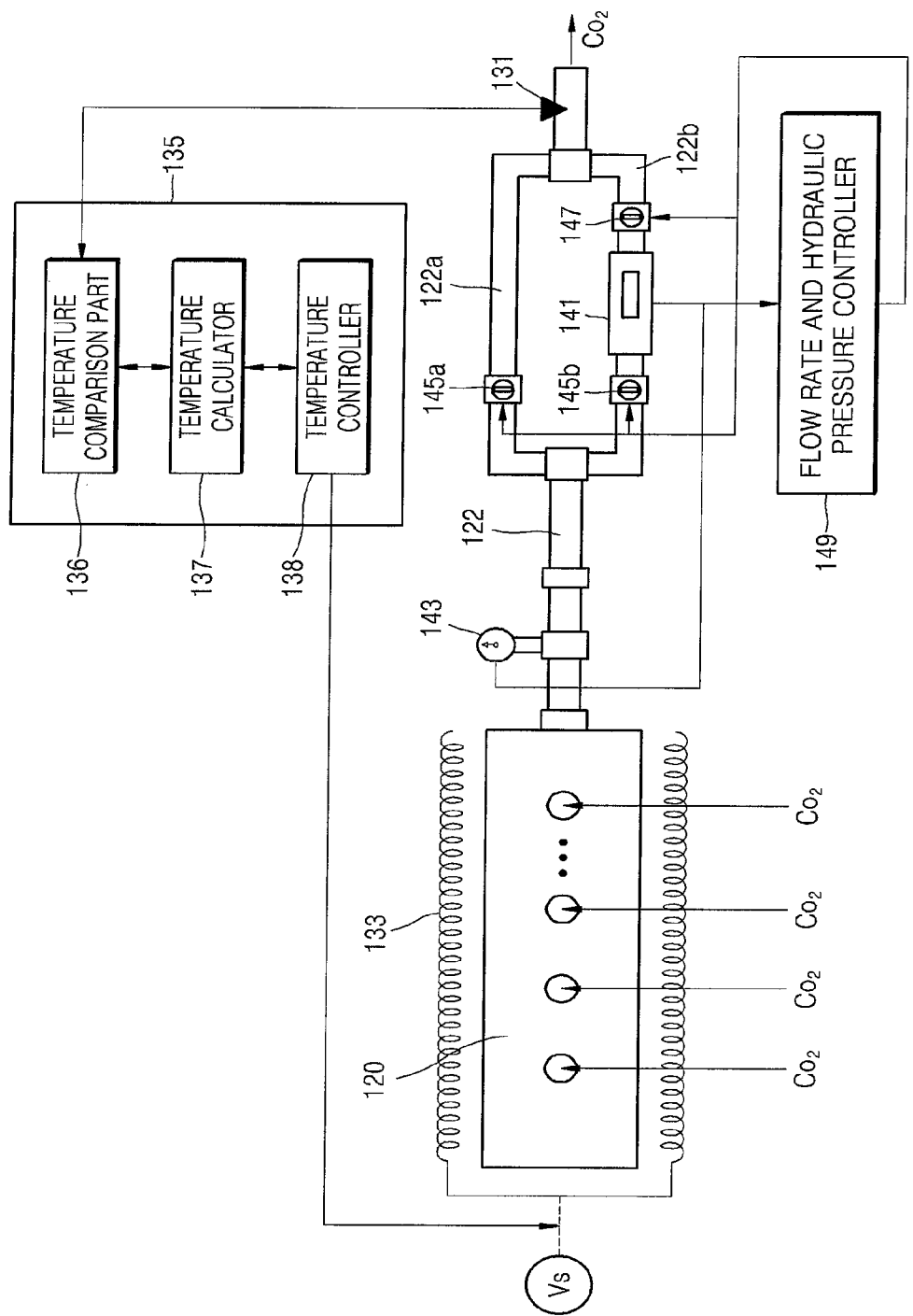
FIG. 2 is a view showing a function of adjusting a temperature, a flow rate, and a hydraulic pressure of $CO_2$ for geologic injection in the apparatus for distributing the $CO_2$ with the advanced function of adjusting the pressure and the temperature of the $CO_2$ for geologic injection of $CO_2$ according to one embodiment of the present invention.
Figure 3:
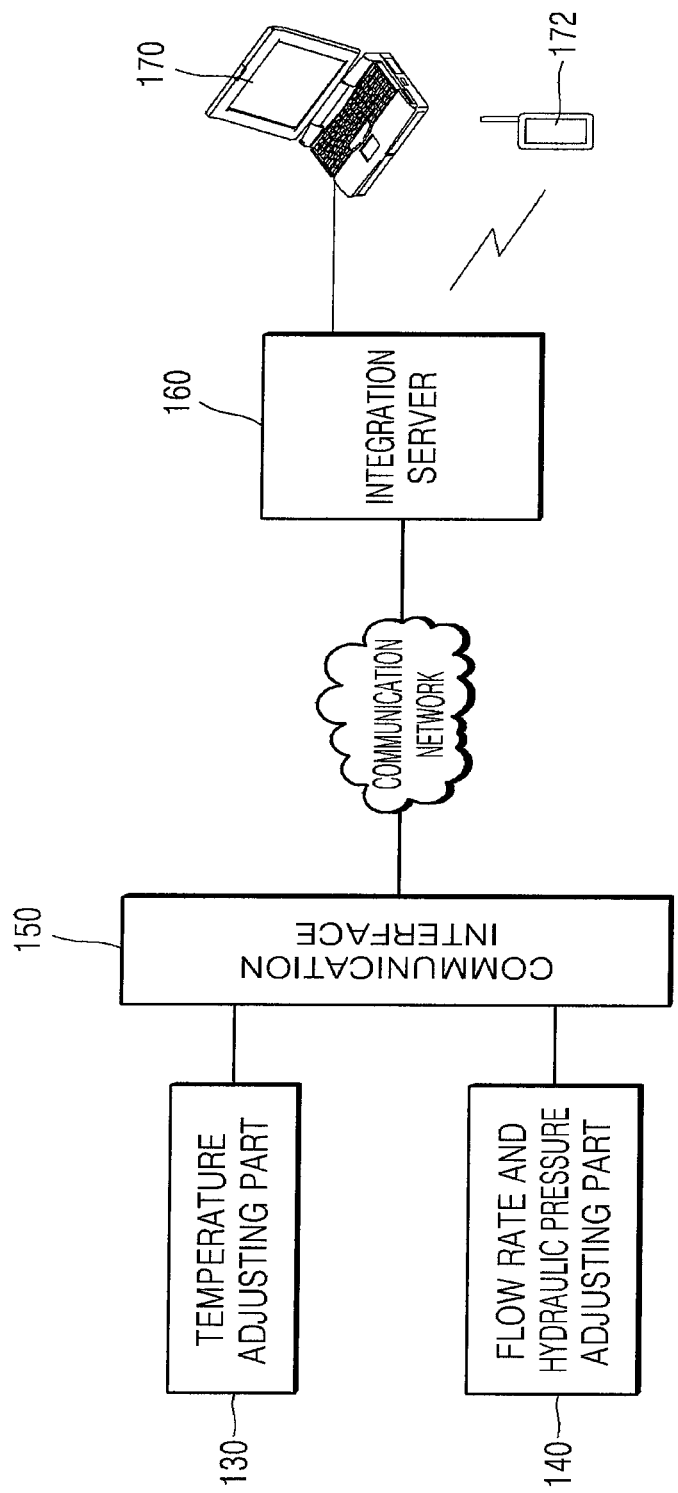
FIG. 3 is a view showing a remote monitoring device adaptable for the apparatus for distributing $CO_2$ with an advanced function of adjusting the pressure and the temperature of the $CO_2$ for the geologic injection of the $CO_2$ according to one embodiment of the present invention.
Figure 4:
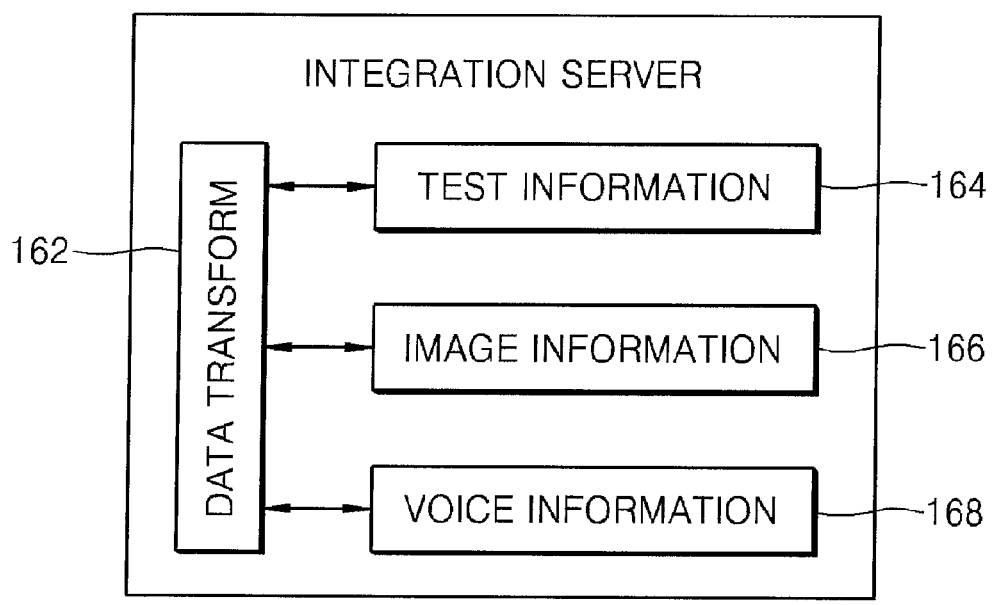
FIG. 4 is a block diagram showing a detailed structure of an integration server based on the embodiment of FIG. 3.
Figure 5:
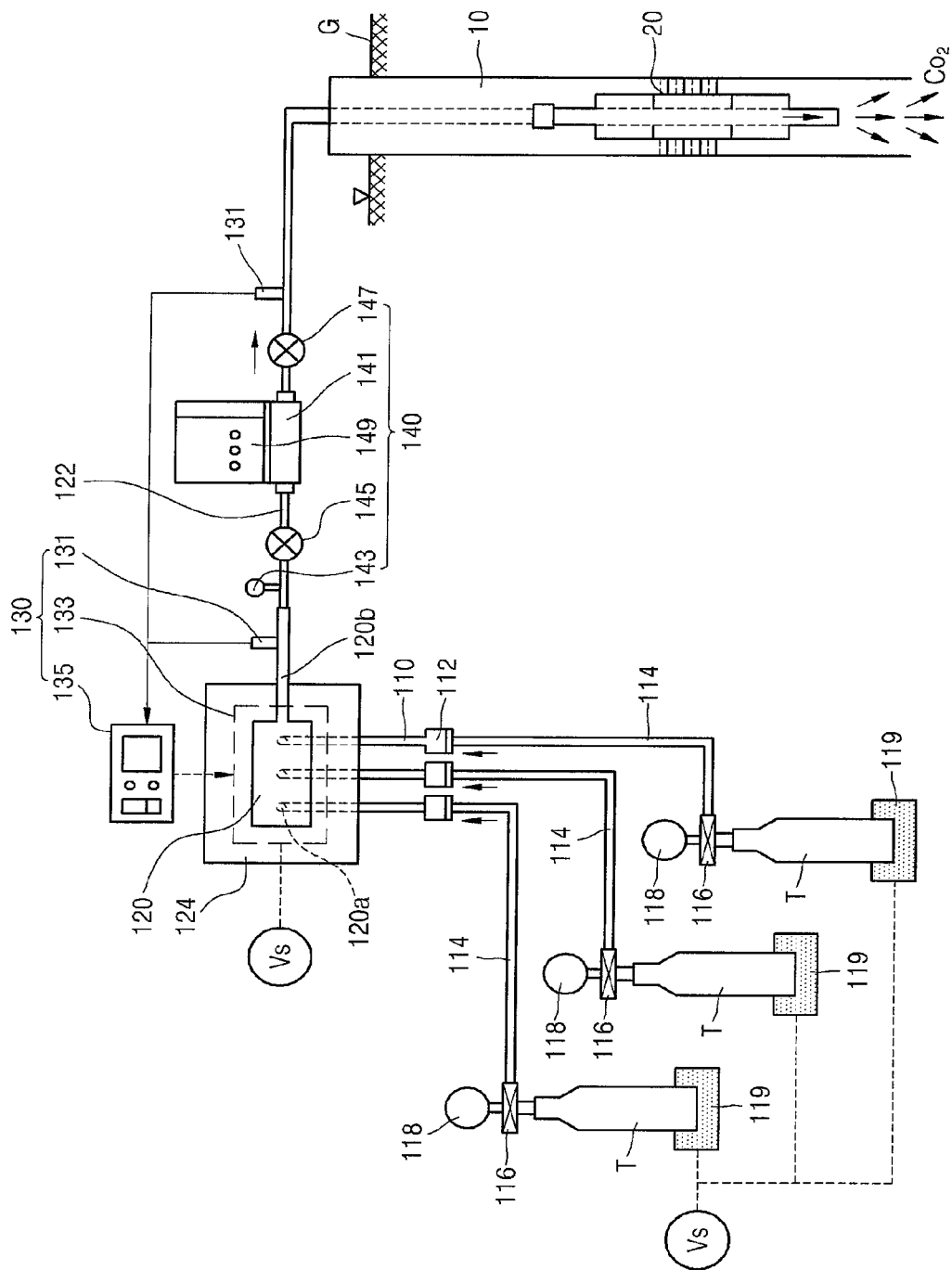
FIG. 5 is a view showing a case in which the apparatus for distributing $CO_2$ with an advanced function of adjusting the pressure and the temperature of the $CO_2$ for the geologic injection of the $CO_2$ according to one embodiment of the present invention is applied to a bore hole to store the $CO_2$.

FIG. 1 is a schematic view showing an apparatus for distributing carbon dioxide ($CO_2$) with an advanced function of adjusting a pressure and a temperature of the $CO_2$ for geologic injection of the $CO_2$ according to one embodiment of the present invention. FIG. 2 is a view showing a function of adjusting a temperature, a flow rate, and a hydraulic pressure of $CO_2$ to be subject to the geologic injection according to one embodiment of the present invention. FIG. 3 is a view showing a remote monitoring device adaptable for the apparatus for distributing the $CO_2$ with an advanced function of adjusting the pressure and the temperature of the $CO_2$ for the geologic injection of the $CO_2$ according to one embodiment of the present invention. FIG. 4 is a block diagram showing a detailed structure of an integration server based on the embodiment of FIG. 3. FIG. 5 is a view showing a case in which the apparatus for distributing the $CO_2$ with an advanced function of adjusting the pressure and the temperature of the $CO_2$ for the geologic injection of the $CO_2$ according to one embodiment of the present invention is applied to a bore hole to store the $CO_2$.

FIGS. 1 to 5 are schematic views showing only features of the present invention in order to clearly explain the configuration, the operation, and the effects of the present invention. Therefore, the accompanying drawings may be expected to have various modifications, and the present invention is not limited by specific modifications.

Hereinafter, the detailed structure of the apparatus for distributing $CO_2$ with an advanced function of adjusting the pressure and the temperature of the $CO_2$ for the geologic injection of the $CO_2$ according to an exemplary embodiment of the present invention will be described with reference to FIG. 1.

As shown in FIG. 1, the apparatus for distributing the $CO_2$ according to the exemplary embodiment of the present invention includes a manifold part 110 including a plurality of branching pipes to receive $CO_2$ for geologic injection from a storage tank, a distribution chamber part 120 to supply the $CO_2$, which has been received through the manifold part 110, to a underground tubular well through an injection pipe 122 connected to the tubular well, a temperature adjusting part 130 to adjust the temperature of the $CO_2$ introduced into the distribution chamber part 120, and a flow rate and hydraulic pressure adjusting part 140 to adjust the flow rate and the hydraulic pressure of $CO_2$ to be injected into the underground through the distribution chamber part 120.

Hereinafter, the manifold part 110 will be described.

The manifold part 110 refers to a pipe member to integrally transfer stored $CO_2$ from a plurality of storage tanks T, which are separately provided, into the distribution chamber part 120.

To this end, the manifold part 110 is preferably prepared in form of a manifold in which pipes are branched in a plurality of rows so that the pipes are prevented from interfering with each other. Preferably, the number of the pipes arranged in a plurality of rows corresponds to the number of the storage tanks T. Therefore, the present invention is not limited to three pipes.

In other words, the storage tanks T provided at separate places to store $CO_2$ have outlets connected to pipes 114, respectively, to effectively transfer the $CO_2$. The manifold part 110 combines distributed $CO_2$, which has been transferred through the pipes 114, in the distribution chamber part 120.

In addition, preferably, the manifold part 110 further includes a socket 112 prepared as an expanded tube at one side of a connection part between the manifold part 110 and the pipe 114 connected with each storage tank T, so that the manifold part 110 can be conveniently coupled with the pipe 114.

Hereinafter, the structure of the storage tanks T will be described in detail.

The storage tanks T refers to a container to temporarily store $CO_2$. Preferably, the storage tanks T include compressive tanks to easily store a greater amount of $CO_2$ within a predetermined internal volume.

Preferably, an electric heating device 119 is provided below each storage tank T to maintain $CO_2$ stored in the storage tank T at a desirable temperature. For example, the electric heating device 119 may include an induction heating coil to receive external voltage Vs to provide a heat generation function.

A stop valve 116 and a pressure gauge 118 may be further provided at the outlet of each storage tank T.

The stop valve 116 is open and closed to intermittently adjust the flow of an internal fluid. In detail, the stop valve 116 is open and closed to adjust the flow of $CO_2$ toward the distribution chamber part 120 from each storage tank T. In addition, the pressure gauge 118 detects the hydraulic pressure of $CO_2$ to be supplied to the distribution chamber part 120 from each storage tank T.

Although the temperature and pressure of $CO_2$ to be discharged from each storage tank T are set to 50° C. and 40 bar according to the present invention, the setting temperate and pressure may be selected as a proper value according to the conditions and environment to perform the present invention.

Although the $CO_2$ stored in the storage tanks T flows through the pipes 114, which are separately provided, the $CO_2$ is combined in the distribution chamber part 120 through the manifold part 112.

The distribution chamber part 120 has an inlet 120a communicating with an output opening of the manifold part 110 and an outlet 120b connected to an injection pipe 122 extending toward the underground tubular well, that is, a bore hole. Accordingly, the distribution chamber part 120 supplies $CO_2$, which has received therein through the manifold part 110, through the injection pipe 122.

In detail, the distribution chamber part 120 serves as a $CO_2$ distributor to combine $CO_2$ received from the storage tanks T through the manifold part 110 and supply the combined $CO_2$ to the underground tubular well through the injection pipe 122 provided at an output side of the distribution chamber part 120.

In order to more stably combine and distribute $CO_2$, an outer portion of the distribution chamber part 120 includes a casing 124 having the form of a pressure container. A heating part 133 serving as a component of a temperature adjuster 130 to be described later may be provided on an outer peripheral portion of the distribution chamber part 120 in such a manner manner that the heating part 133 can be accommodated in the casing 124. The heating part 133 heats $CO_2$ contained in the distribution chamber part 120 to increase the temperature of the $CO_2$ to a temperature set by a user.

Hereinafter, the temperature adjuster 130 will be described.

The temperature adjuster 130 adjusts the temperature of $CO_2$ introduced into the distribution chamber part 120 as described in brief.

To this end, the temperature adjuster 130 may include a temperature sensor 131 to detect the temperature of $CO_2$ for geologic injection, a heating part 133 for heating $CO_2$ introduced into the distribution chamber part 120 to adjust the increase of the temperature of the $CO_2$, and a controller 135 (see FIG. 2) to perform a comparison operation for the temperature of $CO_2$ detected by the temperature sensor 131, calculate a compensation value for the temperature of the $CO_2$ to be increased, and control the operation of the heating part 133.

The configuration of the controller 135 (see FIG. 2) will be described in detail later with reference to FIG. 2, and only the configurations of the temperature sensor 131 and the heating part 133 will be described in detail in the following description.

The temperature sensor 131 is mounted on the injection pipe 122, which is connected to the outlet 120b of the distribution chamber part 120 and extends toward the underground tubular well, and is a sensing device to measure a real temperature of $CO_2$ supplied to the underground tubular well. As examples of the temperature sensor 131, various types of thermometers may be used.

In addition, the heating part 133 surrounds the outer peripheral portion of the distribution chamber part 120 as described above in brief in the description about the distribution chamber part 120.

The heating part 133 heats $CO_2$ introduced into the distribution chamber part 120 within the predetermined temperature range. According to the present embodiment, $CO_2$ may be maintained at the temperature of about 50° C. Such a temperature condition does not restrict the present invention.

As an example, the heating part 133 may include an inductor heat to increase the temperature of the $CO_2$ contained in the distribution chamber part 120 by generating resistance heat after receiving external voltage Vs. The present invention is not limited thereto, but may include various forms of heating part according to various embodiments.

The temperature adjuster 130 may be described in more detail with reference to FIG. 2. Referring to FIG. 2, the temperature adjuster 130 includes the controller 135. The controller 135 actively controls the temperature sensor 131 and the heating part 133 such that the $CO_2$ temperature detection by the temperature sensor 131 can be incorporated with the operation of the heating part 133.

In other words, the controller 135 which serves as an additional component of the temperature adjuster 130 includes a temperature comparison part 136 to compare the temperature of $CO_2$ detected in the temperature sensor 131 with a preset reference value, a temperature calculator 137 to calculate a compensation value for the temperature of the $CO_2$ to be increased by the heating part 133 through the comparison between the reference value and the detected $CO_2$ temperature, and a temperature controller 138 to control the operation of the heating part 133 so that the temperature of the $CO_2$ contained in the distribution chamber part 120 is increased by the compensation value.

In this case, the preset reference value refers to a temperature value of $CO_2$ to be injected into the underground tubular well, which is preset by a user. If the temperature of $CO_2$ detected in the temperature sensor 131 is lower than the reference value, the temperature of the $CO_2$ is increased by the compensation value corresponding to the difference between the detected $CO_2$ temperature and the reference value by controlling the operation of the heating part 133.

The controller 135 further includes the temperature comparison part 136, the temperature calculator 137, and the temperature controller 138, so that the temperature adjusting function according to the present invention will be more actively controlled.

Hereinafter, the flow rate and hydraulic pressure adjusting part 140 will be described with reference to FIG. 1 again.

The flow rate and hydraulic pressure adjusting part 140 adjusts the flow rate and hydraulic pressure of $CO_2$ for geologic injection through the distribution chamber part 120.

As shown in FIG. 1, the flow rate and hydraulic pressure adjusting part 140 includes a flow rate detector 141 to detect the flow rate of $CO_2$ for geologic injection through the distribution chamber part 120, a hydraulic pressure detector 143 to detect the hydraulic pressure of $CO_2$ for geologic injection through the distribution chamber part 120, and valve parts 145 and 147 closed and open to adjust the flow rate and the hydraulic pressure of $CO_2$ for geologic injection through the distribution chamber part 120.

As shown in FIG. 1, the flow rate detector 141 and the hydraulic pressure detector 143 are provided on the injection pipe 122 to effectively detect the flow rate and the hydraulic pressure of $CO_2$ flowing out of the distribution chamber 120. The arrangement of the flow rate detector 141 and the hydraulic pressure detector 143 is only one exemplary embodiment, but the present invention is not limited thereto. Therefore, according to other embodiments, the flow rate detector 141 and the hydraulic pressure detector 143 may have various arrangement forms according to positions, environments, and various conditions for the present invention.

The flow rate detector 141 refers to a typical flow meter. Accordingly, the flow rate detector 141 may include variously-released common flow meters. In addition, the hydraulic pressure detector 143 refers to a typical hydraulic gauge. Therefore, the hydraulic pressure detector 143 may include also variously-released common hydraulic gauges. Accordingly, the details thereof will be omitted.

In addition, the present invention may include various arrangement forms of the valve parts 145 and 147. In other words, the valve parts 145 and 147 shown in FIG. 1 are separately arranged about the flow rate detector 141. Differently, the valve parts 145a, 145b, and 147 shown in FIG. 2 are installed on dual pipes branching from a portion of the injection pipe 122 according to an arrangement form different from the arrangement form of FIG. 1.

The flow rate and hydraulic pressure adjusting part 140 may further include a flow rate and hydraulic pressure controller 149 except for the flow rate detector 141, the hydraulic pressure detector 143, and the valve parts 145 and 147.

The function and the role of the flow rate and hydraulic pressure controller 149 can be recognized in detail through FIG. 2.

In other words, the flow rate and hydraulic pressure controller 149 compares data about the flow rate and the hydraulic pressure of $CO_2$ detected through the flow rate detector 141 and the hydraulic pressure detector 143 with the preset reference values and controls the closing and opening of the valve parts 145a, 145b, and 147 so that $CO_2$ to be injected into the underground is supplied at the proper flow rate and the proper hydraulic pressure. Although the pressure of $CO_2$ to be injected into the underground is preset to about 40 bar, the pressure may be preset to a different value by a user.

The flow rate and hydraulic pressure controller 149 actively controls the flow rate detector 141 and the hydraulic pressure detector 143, and the valve parts 145a, 145b, and 147 closing and opening in cooperation with the flow rate detector 141 and the hydraulic pressure detector 143, so that $CO_2$ can be distributed more quickly and exactly.

Hereinafter, a remote monitoring device adaptable for the apparatus for distributing $CO_2$ with an advanced function of the pressure and temperature of the $CO_2$ for the geologic injection of the $CO_2$ according to the preferred embodiment of the present invention will be described with reference to FIGS. 3 and 4.

Referring to FIG. 3, the remote monitoring device is additionally applied to the apparatus for distributing $CO_2$ with an advanced function of the pressure and temperature of the $CO_2$ for the geologic injection of the $CO_2$ according to the preferred embodiment of the present invention.

In other words, as shown in FIG. 3, the temperature data, the flow rate data, and the hydraulic pressure data of $CO_2$ detected by the temperature adjusting part 130 and the flow rate and hydraulic pressure adjusting part 140, and all signals for the operations of the heating part 133 and the valve parts 145 and 147 according to the data can be transmitted to the integration server 160 through a communication interface 150 over a wire/wireless communication network.

The integration server 160 transmits data, which has been received therein through the communication interface 150, to a remote user terminal such as a user PC 170 or a user smart phone 172, and applies a command, which has been received from the user through feedback, to the temperature adjusting part 130 and the flow rate and hydraulic pressure part 140 through the communication interface.

In addition, the integration server 160 may further include a data log part (not shown) to record the data received through the communication interface 150 in an additional recording medium.

Data transmitted to a remote user through the integration server 160 are converted into at least one of text information, image information, and voice information, so that the data can have the form receivable in the user terminal (such as the user PC 170 or the smart phone 172). Accordingly, remote monitoring and supervising in the process of distributing $CO_2$ can be conveniently performed, and these functions help systematic integral management of the $CO_2$ distribution process.

FIG. 5 is a view showing a case in which the apparatus for distributing $CO_2$ with an advanced function of the pressure and temperature of the $CO_2$ for the geologic injection of the $CO_2$ is applied to a bore hole to store the $CO_2$.

Referring to FIG. 5, through the apparatus for distributing $CO_2$ according to the present invention, $CO_2$ stored in the storage tanks T is integrally combined with each other through the manifold part 110 and the distribution chamber part 120. Thereafter, the $CO_2$ is injected into the tubular well under the ground G in a state that the $CO_2$ is maintained at a proper temperature and at a proper pressure according to the functions of a temperature adjusting part 130 and the flow rate and hydraulic pressure adjusting part 140. In this case, the position of the injection pipe 122 may be fixed by a packer 20 fixed onto the bore hole 10, so that the $CO_2$ can be more stably injected into the underground.

As described above according to the apparatus for distributing $CO_2$ with an advanced function of adjusting the pressure and temperature of the $CO_2$ for geologic injection, as the temperature and the pressure of $CO_2$ are optimized in the distribution of $CO_2$, the $CO_2$ for geologic injection are optimized, the $CO_2$ for the geologic injection can be maintained in a stable phase change. In addition, a remote supervisor can monitor all information, which is obtained in the process of the geologic injection of $CO_2$, in real time, so that the management and supervising of $CO_2$ can be more effectively performed.

As described above, the exemplary embodiment of the apparatus for distributing $CO_2$ with an advanced function of the pressure and temperature of the $CO_2$ for the geologic injection of the $CO_2$ has been described.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for distributing carbon dioxide with an advanced function of adjusting a pressure and a temperature of the carbon dioxide for geologic injection, the apparatus comprising:
   a manifold part including a plurality of branching pipes to receive carbon dioxide for geologic injection from a plurality of storage tanks;
   a distribution chamber part having an inlet communicating with the manifold part and an outlet connected to an injection pipe extending to an underground tubular well, so that the carbon dioxide, which has been received through the manifold part, is supplied through the injection pipe;
   a temperature adjusting part to adjust the temperature of the carbon dioxide introduced into the distribution chamber part; and
   a flow rate and hydraulic pressure adjusting part to adjust a flow rate and a hydraulic pressure of the carbon dioxide injected into an underground through the distribution chamber part
   wherein the temperature adjusting part includes a temperature sensor mounted on the injection pipe to detect the temperature of the carbon oxide to be injected into the underground from the distribution chamber part; and
   a heating part surrounding an outer circumferential portion of the distribution chamber part to heat the carbon dioxide introduced into the distribution chamber part, so that the temperature of the carbon dioxide is increased.

2. The apparatus of claim 1, wherein the temperature adjusting part includes:
   a temperature comparison part to compare the temperature of the carbon dioxide to be injected into the underground, which is detected by the temperature sensor, with a preset reference value;
   a temperature calculator to calculate a compensation value for the temperature of the carbon dioxide to be increased by the heating part based on the comparison with the reference value; and
   a temperature controller to control an operation of the heating part so that the temperature of the carbon dioxide in the distribution chamber part is increased by the compensation value.

3. The apparatus of claim 1, wherein the heating part includes an induction heater.

4. The apparatus of claim 1, wherein the flow rate and hydraulic pressure adjusting part includes:
   a flow rate detector mounted on the injection pipe to detect the flow rate of the carbon dioxide to be injected into the underground;
   a hydraulic pressure detector mounted on the injection pipe to detect the hydraulic pressure of the carbon dioxide to be injected into the underground; and
   a valve part mounted on the injection pipe to adjust the flow rate and the hydraulic pressure of the carbon dioxide to be injected into the underground from the distribution chamber part.

5. The apparatus of claim 4, wherein the flow rate and hydraulic pressure adjusting part further includes a flow rate and hydraulic pressure controller to compare the flow rate and the hydraulic pressure of the carbon dioxide, which are detected through the flow rate detector and the hydraulic pressure detector, with preset reference values, respectively, and to control an open/closing operation of the valve part, so that the carbon dioxide to be injected into the underground is supplied at a proper hydraulic pressure and at a proper flow rate.

6. The apparatus of claim 1, further comprising a socket provided at one side of the manifold part and having a shape of an expanded tube connected with the storage tanks through pipes.

7. The apparatus of claim 1, further comprising electric heating devices provided at lower portions of the storage tanks to heat the carbon dioxide stored in the storage tanks, so that the carbon dioxide is maintained at a predetermined temperature.

8. The apparatus of claim 1, further comprising stop valves and pressure gauges provided at outlets of the storage tanks, wherein each stop valve is closed and open to adjust flow of carbon dioxide to be supplied into the distribution chamber part, and each pressure gauge detects a hydraulic pressure of the carbon dioxide to be supplied to the distribution chamber part.

9. The apparatus of claim 1, further comprising a communication interface used to transmit operating signals of the temperature adjusting part and the flow rate and hydraulic adjusting part through a wire/wireless communication network in real time, for each time, or upon user's request; and
   an integration server to transmit data, which are received through the communication interface, to a remote user terminal, to receive a feedback command requested from the user, and to apply the command the temperature adjusting part and the flow rate and hydraulic pressure adjusting part through the communication interface.

10. The apparatus of claim 9, wherein the integration server includes a data log part to record data received through the communication interface into an additional record medium.

11. The apparatus of claim 9, wherein data transmitted to a remote user through the integration server are converted into at least one of text information, image information, and voice information, so that the transmitted data are receivable in a user terminal.

* * * * *